(12) United States Patent
Zhang

(10) Patent No.: US 12,713,325 B2
(45) Date of Patent: Aug. 18, 2026

(54) METHOD, APPARATUS, RELATED DEVICE, AND STORAGE MEDIUM FOR UPDATING ROUTE SELECTION POLICY

(71) Applicant: Tencent Technology (Shenzhen) Company Limited, Shenzhen (CN)

(72) Inventor: Zhuoyun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 365 days.

(21) Appl. No.: 18/487,906

(22) Filed: Oct. 16, 2023

(65) Prior Publication Data

US 2024/0049101 A1 Feb. 8, 2024

Related U.S. Application Data

(63) Continuation of application No. PCT/CN2022/138734, filed on Dec. 13, 2022.

(30) Foreign Application Priority Data

Dec. 30, 2021 (CN) ........................ 202111663294.2

(51) Int. Cl.
*H04W 40/02* (2009.01)

(52) U.S. Cl.
CPC .................................. *H04W 40/02* (2013.01)

(58) Field of Classification Search
CPC ...................................................... H04L 45/02
USPC ........................................................ 370/254
See application file for complete search history.

(56) References Cited

U.S. PATENT DOCUMENTS 7,710,885 B2 * 5/2010 Ilnicki ..................... H04L 43/00 370/254
8,072,901 B1 * 12/2011 Blair ..................... H04L 47/125 370/254
8,989,199 B1 * 3/2015 Sella ..................... H04L 45/123 370/395.31
9,860,790 B2 * 1/2018 Khan ...................... H04L 67/63
10,097,457 B1 * 10/2018 Srinivasan .............. H04L 45/02
11,165,699 B2 * 11/2021 Filsfils .................... H04L 47/35
(Continued)

FOREIGN PATENT DOCUMENTS

CN 105743762 A 7/2016
CN 110431805 A 11/2019
(Continued)

OTHER PUBLICATIONS

International Search Report for PCT/CN2022/138734 dated Feb. 16, 2023 [PCT/ISA/210].

(Continued)

*Primary Examiner* — Anthony Mejia
(74) *Attorney, Agent, or Firm* — Sughrue Mion, PLLC

(57) ABSTRACT

A method, apparatus, a related device, and a storage medium for updating route selection policy. A user equipment may receive a first route selection policy from a network device, and may include a first policy generation attribute. It may be determined based on the first policy generation attribute whether route selection policy update needs to be performed, and based on a determination that it should be performed, a stored second route selection policy may be updated based on the first route selection policy.

10 Claims, 9 Drawing Sheets

(56) References Cited

U.S. PATENT DOCUMENTS

2002/0141378 A1* 10/2002 Bays .................. H04L 41/0894 370/351
2003/0204619 A1* 10/2003 Bays ...................... H04L 43/10 709/238
2005/0198382 A1* 9/2005 Salmi ...................... H04L 45/00 709/240
2008/0072280 A1* 3/2008 Tardo .................. H04L 63/0428 726/1
2012/0131469 A1* 5/2012 Yamuna .................... G06F 9/54 715/736
2014/0211651 A1* 7/2014 Venkatachalapathy ...................... H04L 45/04 370/254
2014/0321460 A1* 10/2014 Kaneko ................... H04L 49/65 370/386
2017/0012850 A1* 1/2017 Kumbhari ............... H04L 49/25
2017/0064749 A1* 3/2017 Jain ..................... H04L 67/1097
2019/0149449 A1* 5/2019 Morris .................... H04L 45/02 709/245
2021/0037380 A1 2/2021 Lee et al.
2021/0152470 A1* 5/2021 Filsfils .................... H04L 69/22
2021/0168198 A1* 6/2021 Liljenstolpe ........ H04L 67/1004
2022/0167299 A1* 5/2022 Xu ........................ H04W 60/04

FOREIGN PATENT DOCUMENTS

CN 112913283 A 6/2021
WO 2019/153252 A1 8/2019
WO WO-2019227313 A1 * 12/2019 ........... H04W 8/205

OTHER PUBLICATIONS

Xiaomi et al: "Extanding UE policy control for ProSe based services", SA WG2 Meeting #143E, 3GPP Draft; S2-2101661, Feb. 24, 2021, (10 pages).
Extended European Search Report dated Dec. 11, 2024 in Application No. 22914238.5.
Chinese Office Action issued May 8, 2026 in Chinese Application No. 202111663294.2.

* cited by examiner

METHOD, APPARATUS, RELATED DEVICE, AND STORAGE MEDIUM FOR UPDATING ROUTE SELECTION POLICY

RELATED APPLICATION

This application is a continuation application of International Patent Application No. PCT/CN2022/138734 filed on Dec. 13, 2022, which claims priority to Chinese Patent Application No. 202111663294.2 and filed with the China National Intellectual Property Administration on Dec. 30, 2021, the disclosures of which are incorporated herein by reference in their entireties.

FIELD

This application relates to the field of communication technologies, and in particular, to a method, an apparatus, a related device, and a storage medium for updating a route selection policy.

BACKGROUND

In a communication system, a user equipment (UE) may obtain a terminal device route selection policy (URSP) from a network device, and thus perform operations of establishment, bonding, and the like on a protocol data unit (PDU) session based on the terminal device route selection policy (which may be referred herein below as a "route selection policy").

In the related art, after each time a URSP delivered by the network device is received, the UE generally directly updates a stored URSP with the URSP delivered by the network device. However, during actual implementations, there may be a case where the URSP delivered by the network device is the same as the URSP stored in the UE, and the UE cannot determine whether the URSP delivered by the network device is the same as the URSP stored in the UE. Consequently, in this case, the URSP is updated in such an update manner, resulting in waste of processing resources on the UE side. In addition, since the network device cannot determine whether the URSP stored in the UE is a latest URSP, the network device also cannot determine whether the URSP of the UE needs to be updated.

SUMMARY

Embodiments of the disclosure may provide a method, an apparatus, a related device, and a storage medium for updating a route selection policy, which can optimize an update mechanism of a route selection policy, effectively update the route selection policy in time, and avoid waste of processing resources.

Some embodiments of the disclosure may provide a method for updating a route selection policy, performed by user equipment, and the method including: receiving a first route selection policy delivered by a network device, the first route selection policy including a first policy generation attribute; and updating a stored second route selection policy by using the first route selection policy in a case of determining, according to the first policy generation attribute, that route selection policy update needs to be performed.

Some embodiments of the disclosure may provide a method for updating a route selection policy, performed by a network device, and the method including: receiving a second policy generation attribute reported by user equipment; and delivering a first route selection policy to the user equipment in a case of determining, according to the second policy generation attribute, that route selection policy update needs to be performed on the user equipment, the first route selection policy including a first policy generation attribute, the first policy generation attribute being used for the user equipment to determine whether route selection policy update needs to be performed; and in a case that the user equipment determines that route selection policy update needs to be performed, the first route selection policy being used for updating a second route selection policy stored in the user equipment.

Some embodiments of the disclosure may provide an apparatus for updating a route selection policy, the apparatus being runnable in user equipment, and the apparatus including: a receiving unit, configured to receive a first route selection policy delivered by a network device, the first route selection policy including a first policy generation attribute; and an updating unit, configured to update a stored second route selection policy by using the first route selection policy in a case of determining, according to the first policy generation attribute, that route selection policy update needs to be performed.

Some embodiments of the disclosure may provide an apparatus for updating a route selection policy, the apparatus being runnable in a network device, and the apparatus including: a receiving unit, configured to receive a second policy generation attribute reported by user equipment; and a delivering unit, configured to deliver a first route selection policy to the user equipment in a case of determining, according to the second policy generation attribute, that route selection policy update needs to be performed on the user equipment, the first route selection policy including a first policy generation attribute, the first policy generation attribute being used for the user equipment to determine whether route selection policy update needs to be performed; and in a case that the user equipment determines that route selection policy update needs to be performed, the first route selection policy being used for updating a second route selection policy stored in the user equipment.

Some embodiments of the disclosure may provide a computer-readable storage medium, storing one or more instructions, the one or more instructions being suitable to be loaded by a processor to perform the method for updating a route selection policy.

Some embodiments of the disclosure may provide a computer program product, including a computer program; the computer program, when executed by a processor, implementing any method for updating a route selection policy.

Some embodiments of the disclosure may provide a user equipment, including a memory, a processor, and a computer program stored in the memory, the processor executing the computer program to implement the method for updating a route selection policy.

Some embodiments of the disclosure may provide a network device, including a memory, a processor, and a computer program stored in the memory, the processor executing the computer program to perform the method for updating a route selection policy.

DESCRIPTION OF EMBODIMENTS

Figure 1A:
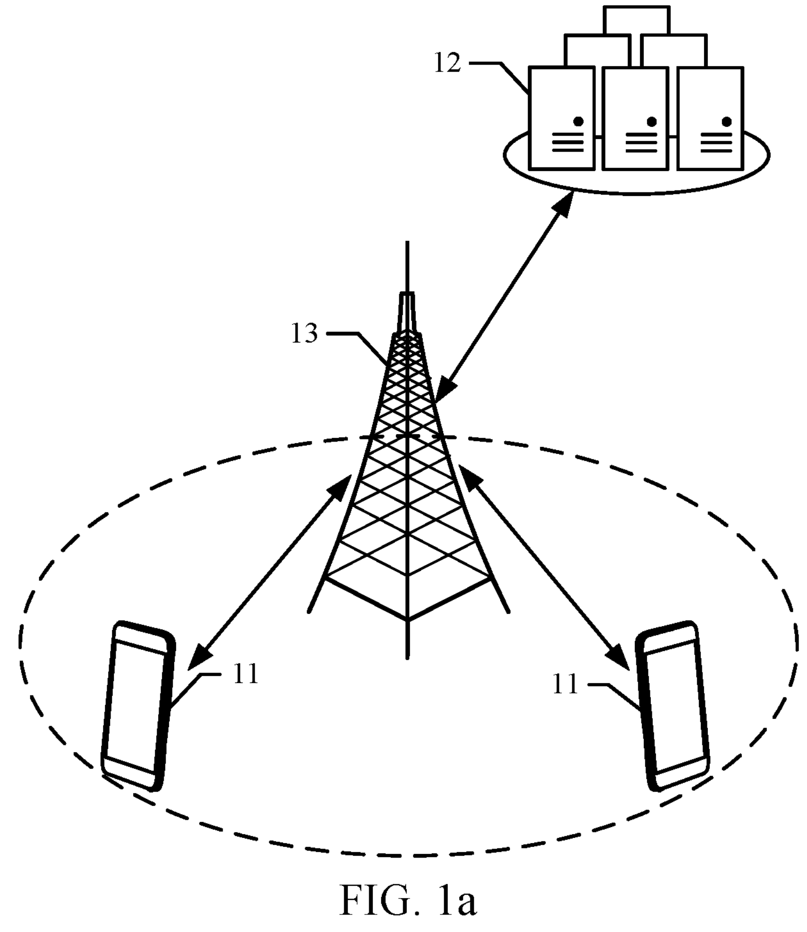
FIG. 1*a* is a system architecture diagram of a communication system according to some embodiments.

Certain embodiments are described in detail below with reference to the drawings. The described embodiments are not to be construed as a limitation to the present disclosure.

In the following descriptions, some related embodiments describe a subset of all possible embodiments. However, it may be understood that the some embodiments may be the same subset or different subsets of all the possible embodiments, and may be combined with each other without conflict.

"Plurality of", as mentioned in the specification means two or more. "And/or" describes an association relationship for describing associated objects and represents that three relationships may exist. For example, A/B may represent the following cases: Only A exists, both A and B exist, and only B exists. Similarly, the phrase "at least one of A and B" includes within its scope "only A", "only B" and "A and B". The character "/" in this specification generally indicates an "or" relationship between the associated objects unless otherwise noted or the context suggests otherwise.

In some embodiments of the present disclosure, a UE route selection policy (URSP) may be understood as a policy used for a UE side to select different PDU sessions for a service flow, and the policy may include a plurality of URSP rules (Rules). Specifically, the URSP rules may include, but are not limited to, a traffic descriptor and a route selection descriptor (RSD). The traffic descriptor may include an application identifier, an internet protocol (IP) descriptor, a non-IP descriptor, and the like. A URSP of each UE may be identified by using a UE policy section identifier (UPSI), and the UPSI may also be referred to as a policy section identifier (PSI) for short.

In some embodiments of the present disclosure, for a problem of updating a route selection policy, a policy update solution may be provided to optimize an update mechanism of the route selection policy, effectively update the route selection policy in time, and avoid waste of processing resources.

In some specific implementations, the policy update solution may be applied to various communication systems, for example: a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a new radio (NR) system, a worldwide interoperability for microwave access (WiMAX) communication system, a 5th generation mobile communication technology (5G) system, or a future mobile communication technology system.

Specifically, the communication system to which the policy update solution provided in some embodiments of the present disclosure may be applied may include: at least user equipment (UE) 11 and a network device 12. The UE 11 may be a mobile or fixed device, and the UE 11 may be configured to communicate through a wired interface or through a wireless interface. It should be appreciated that the communication systems applied discussed above are merely examples, and may not necessarily be limited thereto.

Optionally, the UE 11 may include any one of the following: an access terminal, a subscriber unit, a subscriber station, a mobile station, a mobile console, a remote station, a remote terminal, a mobile device, a user terminal, a terminal, a wireless communication device, a user agent, or a user apparatus. The access terminal may be a cellular telephone, a cordless telephone, a session initiation protocol (SIP) telephone, a personal digital assistant (PDA), a handheld device having a wireless communication function, a computing device or another processing device connected to a wireless modem, an in-vehicle device, a wearable device, an internet of things (IoT) device, a terminal device in a future 5G network, a terminal device in a future evolved public land mobile network (PLMN), or the like.

The network device 12 may refer to a device that may send a URSP to the UE 11, for example, the network device 12 may be a core network device on a network side. The core network device mentioned herein may be a 5G core network device, for example, a policy control function (PCF) network element, an access and mobility management function (AMF) network element, or a session management function (SMF) network element. Alternatively, the core network device mentioned herein may be an evolved packet core (EPC) device of an LTE network, for example, a session management function+core packet gateway (SMF+PGW-C) device. It is to be understood that only examples of several specific implementations of the network device 12 are listed rather than exhaustive. In another embodiment, the network device 12 may alternatively be another device that may communicate with the UE 11. It should be appreciated that the network devices discussed are merely examples, and are not necessarily limited thereto. Nevertheless, for the ease of description, the example of a network device which may be used (unless specified otherwise) may be a PCF.

When the network device 12 is the core network device, the communication system to which some embodiments of the present disclosure are applied may further include an access network device 13. The access network device 13 may provide communication coverage for a particular geographical area, and may communicate with user equipment that is located in the coverage, and the access network device 13 may communicate with the core network device. In this case, the UE 11 is located in the coverage of the access network device 13, and the UE 11 and the network device 12 perform data transmission by using the access network device 13.

Optionally, the access network device 13 may be a network side device in a 5G network, a network side device in a PLMN, a base station (gNB) in a radio access network (RAN) or an NR system, a base transceiver station (BTS) in a GSM system or a CDMA system, a NodeB (NB) in a WCDMA system, an evolved NodeB (eNB or eNodeB) in an LTE system, or a wireless controller, a mobile switching center, a relay station, an access point, an in-vehicle device, a wearable device, a hub, a switch, a bridge, or a router in a cloud radio access network (CRAN), or the like.

For example, the access network device 13 may be a base station. The communication system to which some embodiments of the present disclosure may be applied may be shown in FIG. 1*a*. It is to be understood that FIG. 1*a* only shows an example of a system architecture of a communication system to which an embodiment of the present disclosure is applied, and this is not necessarily limited thereto. For example, the communication system shown in FIG. 1*a* includes only two UEs 11, a network device 12, and an access network device 13. However, during actual application, the communication system may further include more access network devices 13, and another quantity of terminal devices may be included in coverage of each access network device 13. Alternatively, the communication system may include more network devices 12. This may not necessarily be limited in this embodiment of the present disclosure.

Figures 1B, 2:
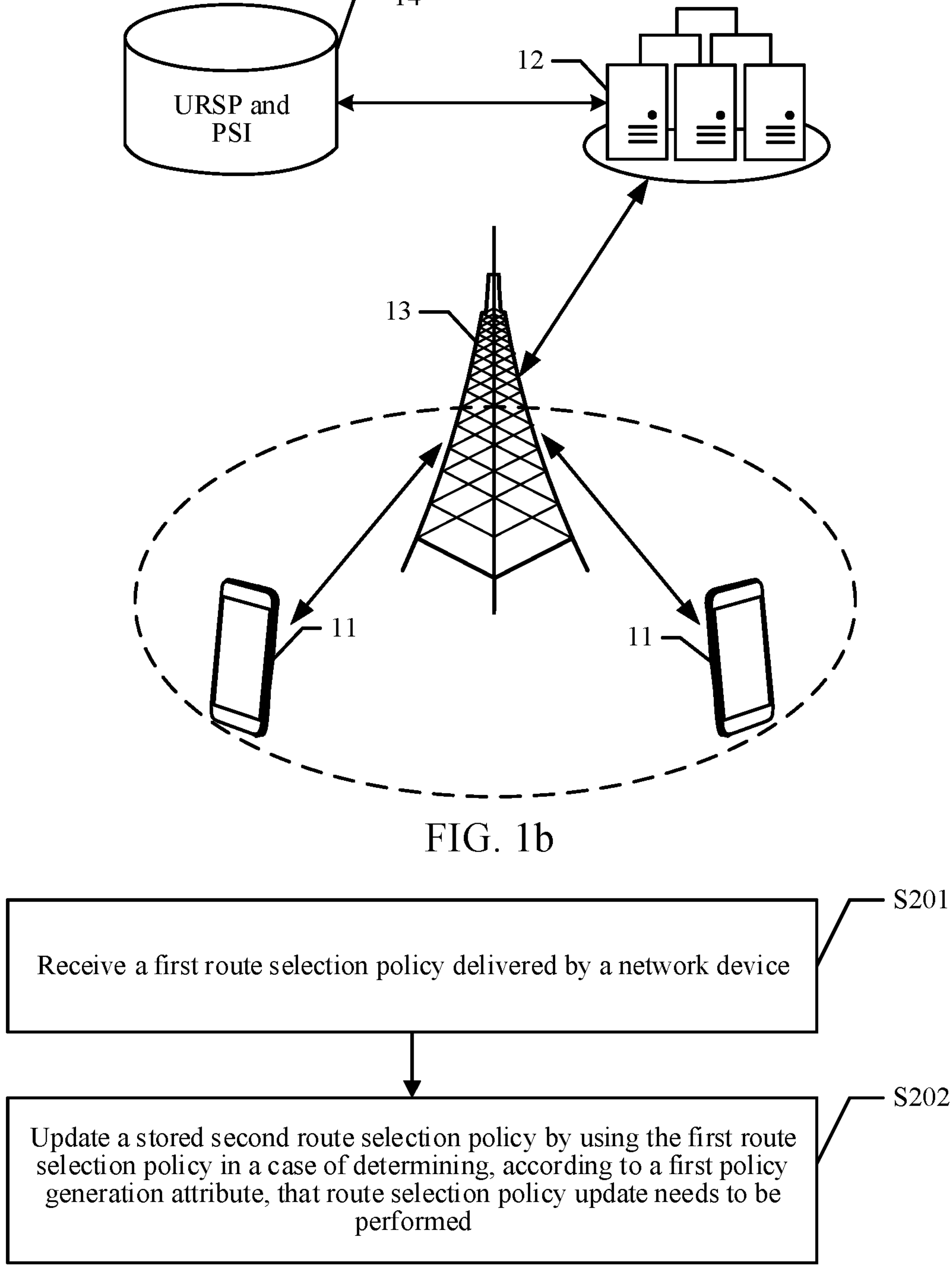
FIG. 1*b* is a system architecture diagram of another communication system according to some embodiments.
FIG. 2 is a schematic flowchart of a method for updating a route selection policy according to some embodiments.

In another example, the communication system may further include a unified data repository (UDR) function network element, a core access and mobility management function (AMF) network element, a session management function (SMF) network element, a user plane function (UPF) network element, a unified data management (UDM) network element, a signaling gateway (SGW) network element, and the like. This may not necessarily be limited thereto in this embodiment of the present disclosure. When the communication system includes a UDR 14, the network device 12 may communicate with the UDR 14, as shown in FIG. 1*b*. In addition, the network device 12 may store a URSP and a corresponding PSI that are involved in each UE 11 in the UDR 14.

In the communication system shown in FIG. 1*b*, the UE 11 may trigger a report process of a URSP. The report process may be triggered in an initial registration process of the UE 11, or may be triggered in a mobility management process in which the UE 11 is switched from an evolved packet system (EPS) to a 5G network, or may be triggered in another process. This may not necessarily be limited thereto according to embodiments of the present disclosure. In addition, when the UE 11 finds that a stored URSP is lost, invalid, or missing, the UE 11 may retrieve the URSP in the initial registration process. That is, when finding that the stored URSP is lost, invalid, or missing, the UE 11 may also trigger the report process. When the UE 11 performs the report process, the UE 11 may include a stored PSI in the report process, to report the stored PSI to a PCF 12. After receiving the PSI reported by the UE 11, the PCF 12 may obtain a latest PSI corresponding to the UE 11 from the UDR 14, then compare the PSI obtained from the UDR 14 with the PSI reported by the UE 11, use a URSP corresponding to the UE stored in the UDR 14 as a latest URSP if the PSI obtained from the UDR 14 is different from the PSI reported by the UE 11, and deliver a corresponding PSI stored in the UDR 14 as an updated PSI to the UE 11, so that the UE 11 performs route selection policy update. The PSI may include the following two parts:

(a) a PLMN identifier part, where the part includes an identifier of a PLMN including a PCF that provides a route selection policy; and (b) a route selection policy code (UE policy selection code, UPSC), where the route selection policy code includes a unique value in the PLMN selected by the PCF.

In practice, it may be shown that the two parts of content in the PSI are relatively fixed, that is, when the PLMN is determined, and rule content in the URSP changes, the PSI does not change. Therefore, it can be understood that the PSI may simply consist of identification information and cannot identify whether a rule in the URSP corresponding to the PSI is an updated rule (that is, a latest rule). However, after receiving the updated PSI from the PCF, due to some circumstances (for example, the UE suddenly crashes in the policy update process or detects insufficient memory in the policy update process), the UE cannot successfully update the URSP corresponding to the PSI in time. Therefore, in this case, after the UE reports the PSI to the PCF in the report process, and when performing PCI comparison, the PCF may determine that the URSP stored in the UR is the latest URSP (that is, a rule in the URSP stored in the UE is a latest rule), and thus incorrectly determines that the URSP in the UE does not need to be updated, resulting in a problem of mismatching between the URSPs. In addition, during actual application, after delivering a URSP, the PCF may also deliver a URSP again due to some reasons, causing the URSP delivered by the PSC to be the same as the URSP stored in the UE. In this case, if the UE directly updates the stored URSP with the URSP delivered by the PCF, waste of processing resources is caused.

Based on this, in the policy update solution provided in some embodiments of the present disclosure, a policy generation attribute may be introduced into the URSP (a route selection policy) or the PSI. The policy generation attribute mentioned herein may refer to a parameter that is allocated for a route selection policy and is used for uniquely identifying the route selection policy when the route selection policy is generated. For example, the policy generation attribute may include one or more of the following: a version number parameter of the route selection policy, a timestamp parameter of the route selection policy, and the like. The version number parameter of the route selection policy may be allocated to the URSP each time the PCF updates a rule in the URSP. Each allocated version number parameter may be generated by adding 1 (+1) to a previous version number parameter, or may be generated by using a random algorithm. A manner of generating the version number parameter is not limited in embodiments of the present disclosure. A timestamp parameter is used for indicating a generation time of a corresponding route selection policy, that is, the timestamp parameter of the route selection policy may be allocated to the URSP based on a current system time each time PCF update a rule in the URSP.

The policy generation attribute may uniquely identify the URSP. Therefore, by introducing a policy generation attribute is introduced in a URSP or a PSI, the UE may report a policy generation attribute corresponding to a stored URSP to the PCF in the report process, and after receiving the policy generation attribute reported by the UE, the PCF may compare a latest policy generation attribute corresponding to the UE in the UDR with the policy generation attribute reported by the UE, to accurately determine whether the URSP in the UE needs to be updated, so that when determining that the URSP needs to be updates, the PCF delivers the URSP corresponding to the UE stored in the UDR and a corresponding PSI to the UE, and the UE performs route selection policy update. In this way, a case that comparing two parts of content in the PSIs causing incorrectly determining that the route selection policy does not need to be updated can be avoided, a problem of mismatching between route selection policies is reduced, and the route selection policy is updated in time. In addition, after receiving the URSP and the PSI delivered by the PCF, the UE may also compare a policy generation attribute in the URSP or the PSI delivered by the PCF with the policy generation attribute stored in the UE, to determine whether a policy update operation is performed by using the URSP delivered by the PCF. In this way, effectiveness of the policy update operation can be ensured, waste of processing resources is avoided, and the URSP is effectively updated. It can be learned that, the policy update solution provided in some embodiments of the present disclosure, the policy generation attribute is introduced in the URSP or the PSI, the update mechanism of the route selection policy can be effectively optimized, the route selection policy can be effectively updated in time, and waste of processing resources can be avoided.

The communication system shown in FIG. 1*b* is merely an example to describe a rough principle of the policy update solution provided in some embodiments of the present disclosure. This may not be necessarily be limited thereto according to example embodiments of the present disclosure. For example, the PCF may alternatively not store a URSP involved in each UE and a corresponding PSI in the UDR but store the data in a storage space of the PCF. Therefore, in this case, the PCF may directly obtain data such as a latest URSP corresponding to the UE, a corresponding PSI, and a policy generation attribute from the storage space, and perform a series of processing based on the obtained data.

Based on the foregoing descriptions, some embodiments of the present disclosure may provide a method for updating a route selection policy. The method may be performed by the user equipment in the communication system mentioned above. Referring to FIG. 2, the method may include the following step S201 and step S202.

S201. Receive a first route selection policy delivered by a network device. In some embodiments of the present disclosure, any route selection policy may include a policy generation attribute. That is, the first route selection policy delivered by the network device may include a policy generation attribute, and a second route selection policy stored in a local space of the user equipment may also include a policy generation attribute. In addition, any policy generation attribute mentioned in some embodiments of the present disclosure may include: a version number parameter or a timestamp parameter of a corresponding route selection policy. This may not be necessarily limited thereto according to some embodiments of the present disclosure. That is, a first policy generation attribute in the delivered first route selection policy includes: a first version number parameter of the first route selection policy, or a first timestamp parameter of the first route selection policy, the first timestamp parameter being used for indicating a generation time of the first route selection policy. A second policy generation attribute in the stored second route selection policy includes: a second version number parameter of the second route selection policy, or a second timestamp parameter of the second route selection policy, the second timestamp parameter being used for indicating a generation time of the second route selection policy.

In some implementations, after receiving the first route selection policy delivered by the network device, the user equipment may compare the first policy generation attribute in the first route selection policy with the second policy generation attribute in the stored second route selection policy. In a case that the first policy generation attribute is different from the second policy generation attribute, the user equipment determines that route selection policy update needs to be performed; and in a case that the first policy generation attribute is the same as the second policy generation attribute, the user equipment determines that route selection policy update does not need to be performed.

In some other implementations, in addition to delivering the first route selection policy, the network device may further deliver a first policy section identifier (PSI) of the first route selection policy, the delivered first PSI being used for the user equipment to determine whether route selection policy update needs to be performed. Correspondingly, in addition to receiving the first route selection policy delivered by the network device, the user equipment may further receive the first policy section identifier (PSI) of the first route selection policy delivered by the network device.

Figure 3:
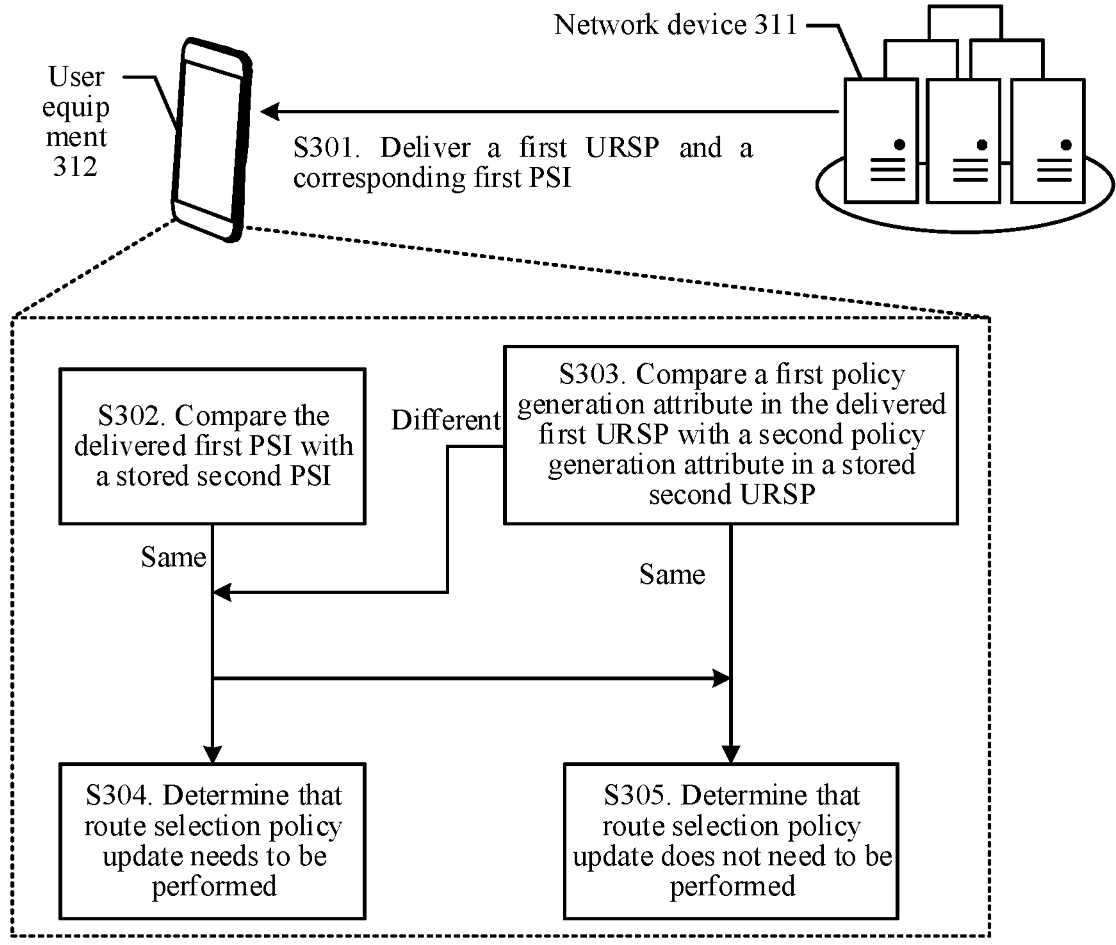
FIG. 3 is a schematic logical diagram in which user equipment determines whether to perform route selection policy update according to some embodiments.

As shown in FIG. 3, in step S301, a network device 311 may deliver a first URSP and a corresponding first PSI to user equipment 312 through signaling or may deliver a first URSP and a corresponding first PSI to user equipment 312 through different signaling. This may not necessarily be limited thereto according to embodiments of the present disclosure.

In step S302, the user equipment 312 compares the delivered first PSI with a second PSI of a stored second URSP. In step S303, the user equipment 312 compares a first policy generation attribute in the delivered first URSP with a second policy generation attribute in the stored second URSP.

In a case that the first PSI is the same as the second PSI and the first policy generation attribute is different from the second policy generation attribute, in step S304, the user equipment determines that route selection policy update needs to be performed; and in a case that the first PSI is the same as the second PSI and the first policy generation attribute is the same as the second policy generation attribute, in step S305, the user equipment determines that route selection policy update does not need to be performed.

Based on the foregoing description, when the policy generation attribute includes the version number parameter, a method in which the user equipment determines whether route selection policy update needs to be performed is that: when receiving a first URSP, the UE may compare a received first PSI (that is, the PSI delivered by the network device) with a stored second PSI, and compare a version number parameter in the received first URSP with a version number parameter in the stored second URSP. When the two PSIs are the same, the UE determines that the two PSIs aim at a same URSP. Only when the two version number parameters are also the same, the UE determines that the received first URSP is the same as the stored second URSP, and may determine that route selection policy update does not need to be performed. If the two version number parameters are different, the UE determines that the received first URSP is different from the stored second URSP, and the stored second URSP needs to be updated to synchronize with a latest URSP generated by the network device.

Based on the foregoing description, when the policy generation attribute includes the timestamp parameter, a method in which the user equipment determines whether route selection policy update needs to be performed is that:

when receiving a first URSP, the UE may compare a received first PSI (that is, the PSI delivered by the network device) with a stored second PSI, and compare a first timestamp parameter in the received first URSP with a second timestamp parameter in the stored second URSP. When the two PSIs are the same, the UE determines that the two PSIs aim at a same URSP. Only when the two timestamp parameters are also the same, the UE determines that the received first URSP is the same as the stored second URSP, and may determine that route selection policy update does not need to be performed. If the two timestamp parameters are different, the UE determines that the received first URSP is different from the stored second URSP, and the stored second URSP needs to be updated to synchronize with a latest URSP generated by the network device.

When performing the step of comparing the first PSI with the second PSI and the step of comparing the first policy generation attribute with the second policy generation attribute, the user equipment may simultaneously perform the two steps, or may perform the two steps in a specific sequence. This may not be necessarily be limited thereto according to some embodiments of the present disclosure. In addition, optionally, if an execution sequence of the step of comparing the PSIs is earlier than an execution sequence of the step of comparing the policy generation attributes, when finding that the two PSIs are different by comparing the PSIs, the user equipment may directly determine that the two PSIs aim at different URSPs, and may directly determine that route selection policy update needs to be performed without further performing an operation of comparing the policy generation attributes. In this way, processing resources can be effectively saved.

S202. Update a stored second route selection policy by using the first route selection policy in a case of determining, according to a first policy generation attribute, that route selection policy update needs to be performed.

During specific implementation, when updating the stored second route selection policy by using the delivered first route selection policy, the user equipment may update the stored second route selection policy in a full update or momentum update manner. The full update manner may include: directly replacing the stored second route selection policy with the delivered first route selection policy. The momentum update manner includes: determining updated content in the delivered first route selection policy relative to the stored second route selection policy, and replacing corresponding content in the stored second route selection policy with the updated content.

According to some embodiments, by introducing a policy generation attribute into a route selection policy, after receiving a first route selection policy delivered by the network device, the user equipment may first accurately determine, according to a first policy generation attribute in the delivered first route selection policy, whether route selection policy update needs to be performed on a second route selection policy stored in a local space, so that when determining that route selection policy update needs to be performed, the user equipment updates the stored second route selection policy in time by using the first route selection policy delivered by the network device. In such an update manner, a problem that a policy update operation is still performed in a case that a delivered route selection policy is the same as a stored route selection policy can be avoided, effectiveness of the policy update operation can be ensured, waste of processing resources can be avoided, and the route selection policy can be effectively updated. In addition, it can be ensured that an update mechanism of the route selection policy is optimized without changing a policy section identifier (PSI) of the route selection policy, and a case that comparing PSIs causes incorrectly determining that the route selection policy does not need to be update is avoided, so that a problem of mismatching between the route selection policies is reduced, and the route selection policy is updated in time.

Figure 4:
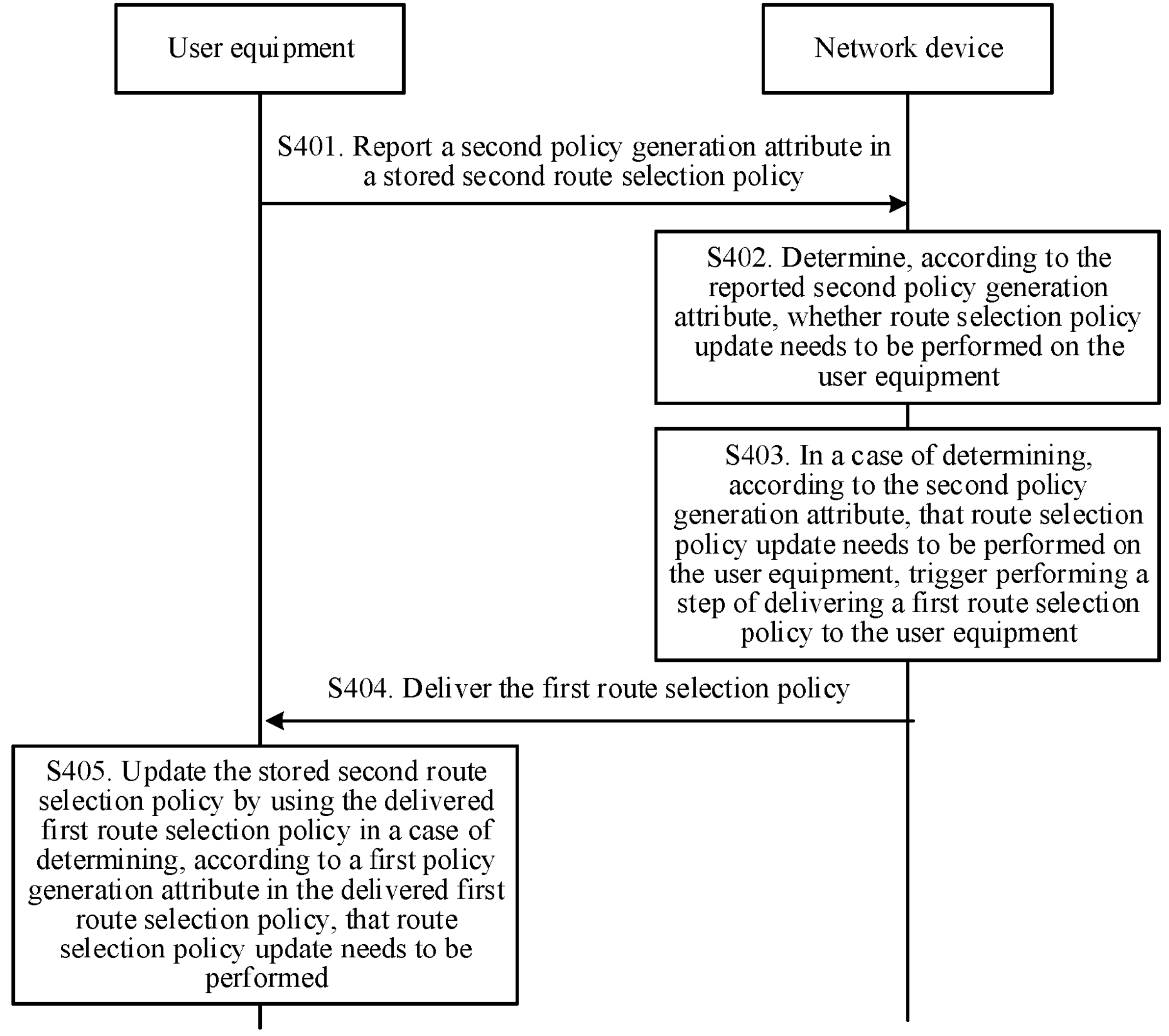
FIG. 4 is a schematic flowchart of a method for updating a route selection policy according to some embodiments.

FIG. 4 is another example method for updating a route selection policy according to some embodiments of the present disclosure. The method includes interaction between user equipment and a network device. As shown in FIG. 4, the method may include the following step S401 to step S405.

S401. User equipment reports a second policy generation attribute in a stored second route selection policy to a network device.

The second policy generation attribute is used for the network device to determine whether route selection policy update needs to be performed on the user equipment. Correspondingly, the network device may receive the policy generation attribute reported by the user equipment; and perform step S402 after receiving the policy generation attribute reported by the user equipment.

S402. The network device determines, according to the reported second policy generation attribute, whether route selection policy update needs to be performed on the user equipment.

During specific implementation, the network device obtains a latest route selection policy, and compares the reported second policy generation attribute with a policy generation attribute in the latest route selection policy. In a case that the reported second policy generation attribute is different from the policy generation attribute in the latest route selection policy, the network device determines that route selection policy update needs to be performed on the user equipment, and uses the latest route selection policy as a first route selection policy. In a case that the reported second policy generation attribute is the same as the policy generation attribute in the latest route selection policy, the network device determines that route selection policy update does not need to be performed on the user equipment.

The latest route selection policy mentioned herein is a latest URSP corresponding to the user equipment that is stored in the network device or the UDR.

According to some implementations, when the latest route selection policy is located in the UDR, the network device may send an attribute query request to the UDR, to request the UDR to return the policy generation attribute in the latest route selection policy, and then perform a subsequent operation of comparing the policy generation attributes.

According to some implementations, when the latest route selection policy is located in the UDR, the network device may send a policy obtaining request to the UDR, the policy obtaining request including a PSI of the latest route selection policy, and the policy obtaining request being used for requesting the UDR to return the latest route selection policy corresponding to the PSI, so that after receiving the route selection policy returned by the UDR, the network device extracts the policy generation attribute from the route selection policy returned by the UDR, and then performs a subsequent operation of comparing the policy generation attributes.

According to some implementations, when the latest route selection policy is located in the UDR, the network device may send a policy update determining request to the UDR, to request the UDR to determine, according to a reported policy generation attribute, whether route selection policy update needs to be performed on the user equipment. In this case, the policy update determining request may include a PSI of the latest route selection policy and the reported second policy generation attribute. The UDR may determine the latest route selection policy according to the PSI in the policy update determining request, and compare the second policy generation attribute in the policy update determining request with the policy generation attribute in the latest route selection policy, so that when detecting that the two policy generation attributes are different, the UDR returns the latest route selection policy corresponding to the PSI and a comparison result to the network device, and when detecting that the two policy generation attributes are the same, the UDR returns a comparison result to the network device.

Optionally, in addition to reporting the second policy generation attribute in the stored second route selection policy to the network device, the user equipment may further report a second policy section identifier (PSI) of the second route selection policy to the network device, the second PSI being used for the network device to determine whether route selection policy update needs to be performed on the user equipment. The user equipment may report the second policy generation attribute in the stored second route selection policy and the corresponding second PSI to the network device by using signaling, or may separately report the second policy generation attribute in the stored second route selection policy and the corresponding second PSI to the network device by using different signaling. This may not necessarily be limited thereto according to embodiments of the present disclosure.

In this case, the network device may further receive the second policy section identifier (PSI) reported by the user equipment. Then, the network device may compare the reported second PSI with the PSI of the latest route selection policy and compare the reported second policy generation attribute with the policy generation attribute in the latest route selection policy. In a case that the reported second PSI is the same as the PSI of the latest route selection policy and the reported second policy generation attribute is different from the policy generation attribute in the latest route selection policy, the network device determines that route selection policy update needs to be performed, and uses the latest route selection policy as the first route selection policy. In a case that the reported second PSI is the same as the PSI of the latest route selection policy and the reported second policy generation attribute is the same as the policy generation attribute in the latest route selection policy, the network device determines that route selection policy update does not need to be performed.

Figure 5A:
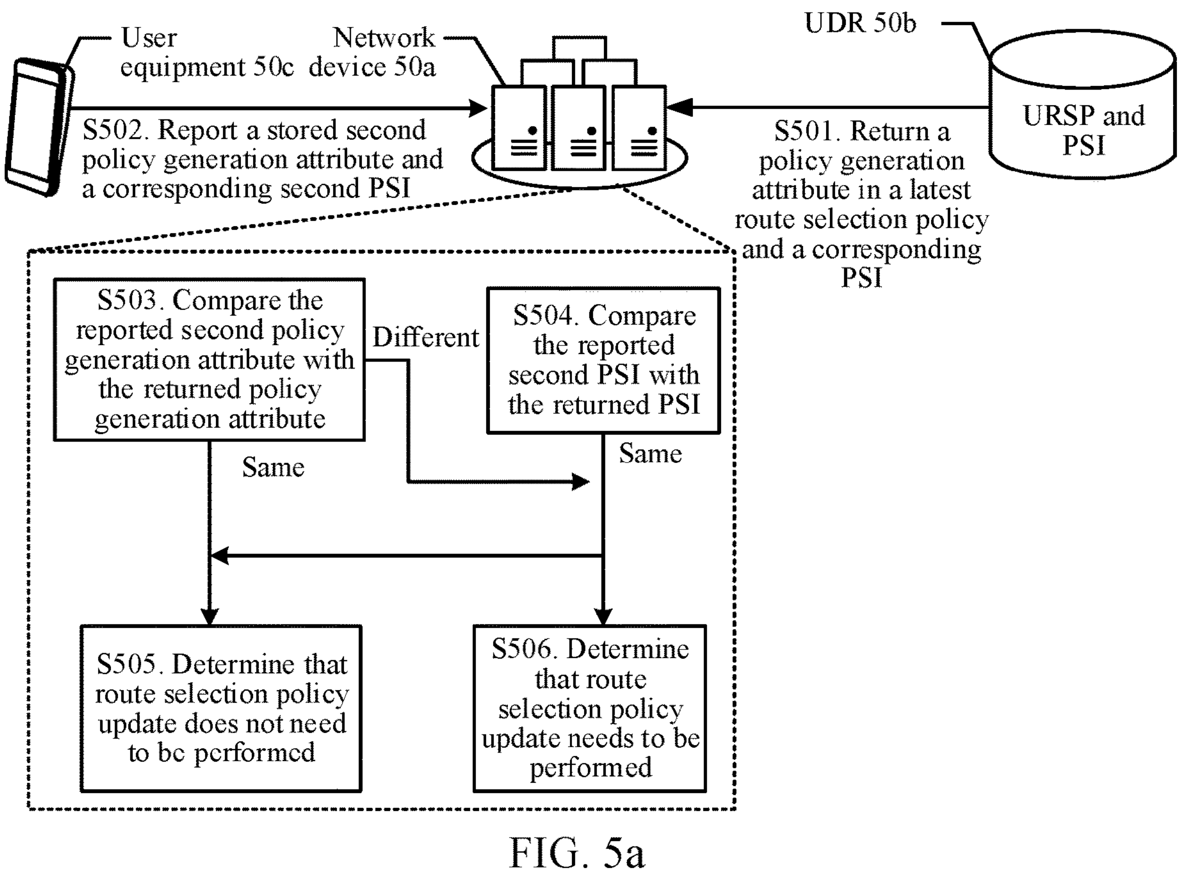
FIG. 5*a* is a schematic logical diagram in which a network device determines whether to perform route selection policy update according to some embodiments.

When the latest route selection policy and the corresponding PSI are located in the UDR, an example implementation is shown in FIG. 5*a*.

Step S501. A network device 50*a* requests a UDR 50*b* to return a policy generation attribute in a latest route selection policy and a corresponding PSI.

Step S502. User equipment 50*c* reports a second policy generation attribute in a stored second route selection policy and a corresponding second PSI.

Step S503. The network device 50*a* compares the second policy generation attribute reported by the user equipment 50*c* with the policy generation attribute returned by the UDR 50*b*. Step S504. The network device 50*a* compares the second PSI reported by the user equipment 50*c* and the PSI returned by the UDR 50*b*.

Step S505. In a case that the second PSI reported by the user equipment 50*c* is the same as the PSI returned by the UDR 50*b*, and the second policy generation attribute reported by the user equipment 50*c* is the same as the policy generation attribute returned by the UDR 50*b*, the network device 50*a* determines that route selection policy update does not need to be performed.

Step S506. In a case that the second PSI reported by the user equipment 50*c* is the same as the PSI returned by the UDR 50*b*, and the second policy generation attribute reported by the user equipment 50*c* is different from the policy generation attribute returned by the UDR 50*b*, the network device 50*a* determines that route selection policy update needs to be performed and uses the latest route selection policy returned by the UDR 50*b* as a first route selection policy.

Figure 5B:
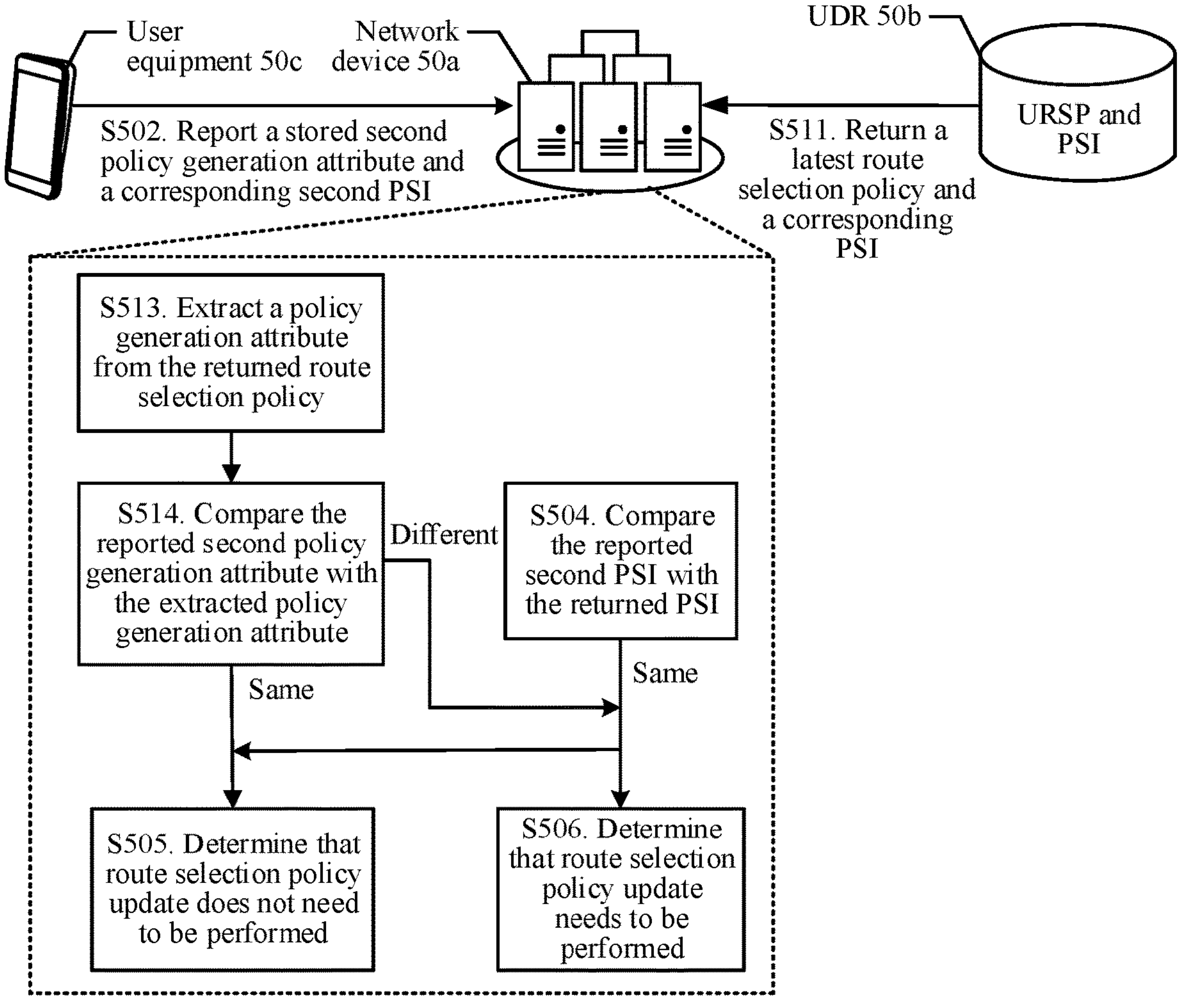
FIG. 5*b* is a schematic logical diagram in which another network device determines whether to perform route selection policy according to some embodiments.

Another example implementation is shown in FIG. 5*b*.

Step S511. A network device 50*a* requests a UDR 50*b* to return a latest route selection policy and a corresponding PSI.

Step S513. The network device 50*a* extracts a policy generation attribute from the route selection policy returned by the UDR 50*b*. Step S514. The network device 50*a* compares the reported second policy generation attribute with the extracted policy generation attribute.

Descriptions of step S502, S504, S505, and S506 are the same as that in FIG. 5*a*.

Based on the foregoing description, when the policy generation attribute includes the version number parameter, when sending a second PSI to the network device, the user equipment needs to simultaneously send a second version number parameter in a stored second URSP. In this case, a method in which the network device determines whether route selection policy update needs to be performed includes: comparing the received second PSI (that is, the PSI reported by the user equipment) with a PSI of a latest URSP, and comparing the received second version number parameter (that is, the version number parameter reported by the user equipment) with a version number parameter in the latest URSP. When the two PSIs are the same, but the two version number parameters are different, the network device may determine that route selection policy update needs to be performed, and may initiate a URSP update process, to trigger delivering of the latest URSP to the user equipment. When the two PSIs are the same and the two version number parameters are the same, the network device determines that the second URSP stored in the UE is the latest and does not need to be updated.

Based on the foregoing description, when the policy generation attribute includes the timestamp parameter, when sending a second PSI to the network device, the user equipment needs to simultaneously send a second timestamp parameter in a stored second URSP. In this case, a method in which the network device determines whether route selection policy update needs to be performed includes: comparing the received second PSI (that is, the PSI reported by the user equipment) with a PSI of a latest URSP, and comparing the received second timestamp parameter (that is, the timestamp parameter reported by the user equipment) with a timestamp parameter in the latest URSP. When the two PSIs are the same, but the two timestamp parameters are different, the network device may determine that route selection policy update needs to be performed, and may initiate a URSP update process, to trigger delivering of the latest URSP to the user equipment. When the two PSIs are the same and the two timestamp parameters are the same, the network device determines that the second URSP stored in the UE is the latest and does not need to be updated.

When performing the step of comparing the reported second PSI with the PSI of the latest route selection policy and performing the step of comparing the reported second policy generation attribute with the policy generation attribute in the latest route selection policy, the network device may simultaneously perform the two steps, or may perform the two steps in a specific sequence. This may not necessarily be limited thereto according to some embodiments of the present disclosure. In addition, optionally, if an execution sequence of the step of comparing the PSIs is earlier than an execution sequence of the step of comparing the policy generation attributes, when finding that the two PSIs are different by comparing the PSIs, the network device may directly determine that route selection policy update needs to be performed without further performing an operation of comparing the policy generation attributes. In this way, processing resources can be effectively saved.

In addition, when the latest route selection policy is located in the UDR, the network device may also send the second PSI reported by the UE and the second policy generation attribute reported by the UE to the UDR, so that the UDR performs the step of comparing the reported second PSI with the PSI of the latest route selection policy and the step of comparing the reported second policy generation attribute with the policy generation attribute in the latest route selection policy, and returns a comparison result to the network device. When determining that route selection policy update needs to be performed, the UDR returns the latest route selection policy to the network device.

S403. In a case of determining, according to the second policy generation attribute, that route selection policy update needs to be performed on the user equipment, the network device triggers performing a step of delivering a first route selection policy to the user equipment, that is, triggers performing step S404.

S404. The network device delivers the first route selection policy to the user equipment.

It can be understood from the foregoing that after determining that route selection policy update needs to be performed on the user equipment, the network device delivers the first route selection policy to the user equipment. In addition, a first policy generation attribute in the delivered first route selection policy is used for the user equipment to determine whether route selection policy update needs to be performed. In a case that the user equipment determines that route selection policy update needs to be performed, the delivered first route selection policy is used for updating a second route selection policy stored in the user equipment.

S405. The user equipment updates the stored second route selection policy by using the delivered first route selection policy in a case of determining, according to the first policy generation attribute in the delivered first route selection policy, that route selection policy update needs to be performed.

In some embodiments of the present disclosure, by introducing a policy generation attribute into a route selection policy, after receiving a policy generation attribute reported by the user equipment, the network device may compare a policy generation attribute in a latest URSP with the policy generation attribute reported by the user equipment, to accurately determine whether a URSP in the user equipment needs to be updated, and deliver the latest URSP to the user equipment when determining that the URSP in the user equipment needs to be updated, so that the user equipment performs route selection policy update. In this way, a case that comparing PSIs causes accurately determining that the route selection policy does not need to be updated can be avoided, a problem of mismatching between the route selection policies is reduced, and the route selection policy is updated in time. In addition, after receiving the URSP delivered by the network device, the user equipment may also compare a policy generation attribute in the URSP delivered by the network device with the stored policy generation attribute, to determine whether a policy update operation is performed by using the URSP delivered by the network device. In this way, effectiveness of the policy update operation can be ensured, waste of processing resources is avoided, and the URSP is effectively updated.

In the foregoing method embodiments shown in FIG. 2 and FIG. 4, an example in which the policy generation attribute may be added to the route selection policy is used for description. In another embodiment, the policy generation attribute may alternatively be added to the PSI, to identify different versions of rule content of the URSP. For example, when the policy generation attribute is the version number parameter, the PSI may include the following three parts:

(a) a PLMN identifier part, where the part includes an identifier of a PLMN of a PCF that provides a route selection policy;

(b) a route selection policy code (UE policy selection code, UPSC), where the route selection policy code includes a unique value in the PLMN selected by the PCF; and (c) a version number parameter of a URSP.

When the PLMN is determined and the UPSC is determined, and when updating a URSP rule each time, the network device allocates a new version number parameter to the URSP rule, for example, the version number parameter+1.

Figures 6, 7:
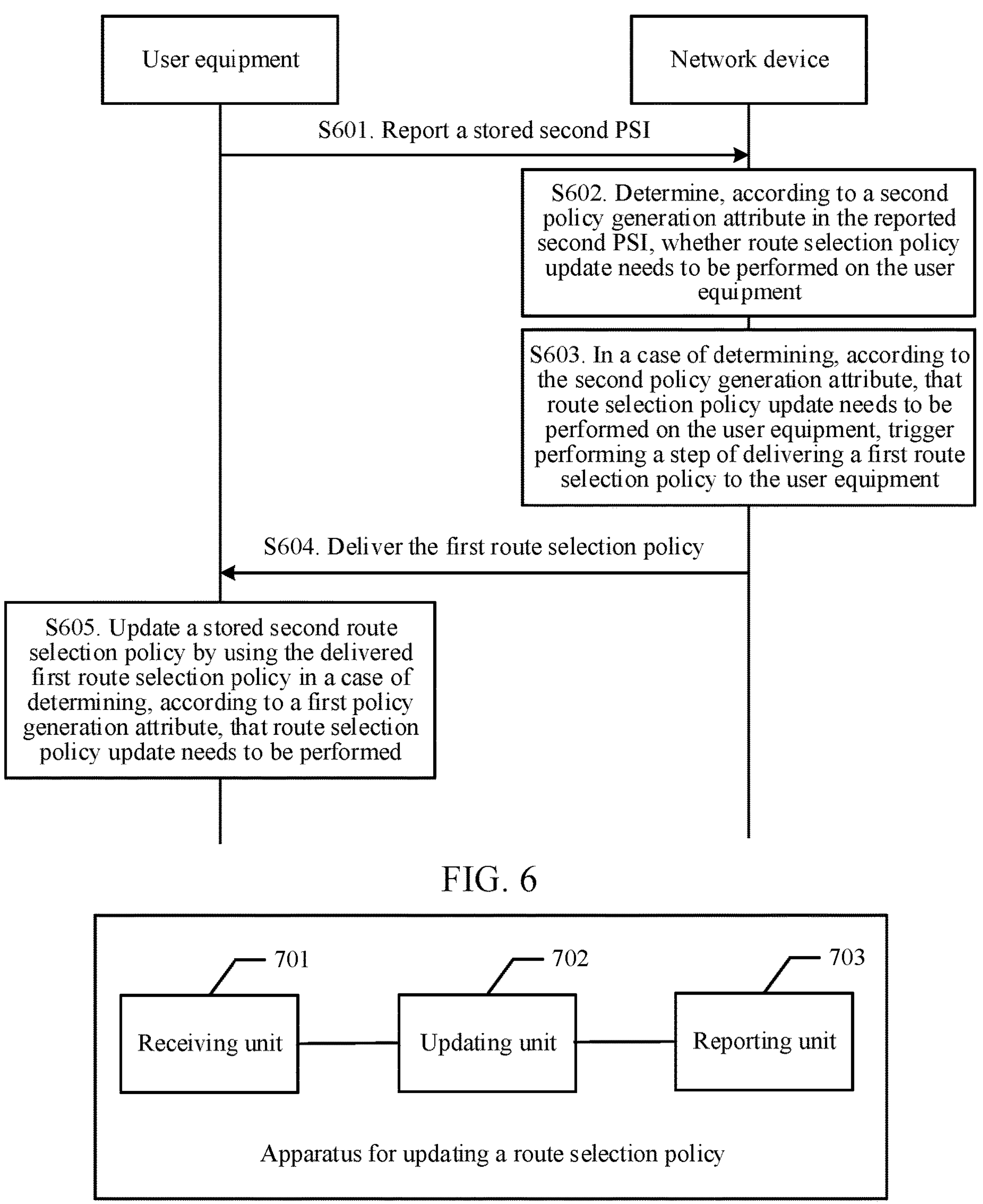
FIG. 6 is a schematic flowchart of a method for updating a route selection policy according to some embodiments.
FIG. 7 is a schematic structural diagram of an apparatus for updating a route selection policy according to some embodiments.

Based on this, when the policy generation attribute is introduced into the PSI, some embodiments of the present disclosure may further provide a corresponding method for updating a route selection policy. The method may include interaction between user equipment and a network device. Referring to FIG. 6, an example method may include the following step S601 to step S605.

S601. User equipment reports a second PSI of a stored second route selection policy to a network device, the reported second PSI being used for the network device to determine whether route selection policy update needs to be performed on the user equipment, and the reported second PSI including a second policy generation attribute in the stored second route selection policy.

Correspondingly, the network device may receive the second PSI reported by the user equipment. After receiving the second PSI reported by the user equipment, the network device may first compare (a) in the reported second PSI with (a) in a PSI of a latest route selection policy, and compare (b) in the reported second PSI with (b) in the PSI of the latest route selection policy. When (a) in the two PSIs is the same and (b) in the two PSIs is the same, the network device may trigger performing step S602.

S602. The network device determines, according to the second policy generation attribute in the reported second PSI, whether route selection policy update needs to be performed on the user equipment.

During specific implementation, the network device may compare the second policy generation attribute in the reported second PSI with a policy generation attribute in the PSI of the latest route selection policy. In a case that the second policy generation attribute is different from the policy generation attribute in the current PSI, the network device determines that route selection policy update needs to be performed on the user equipment. In a case that the second policy generation attribute is the same as the policy generation attribute in the current PSI, the network device determines that route selection policy update does not need to be performed on the user equipment.

Based on the foregoing description, when the policy generation attribute includes the version number parameter, a method in which the network device determines whether route selection policy update needs to be performed includes: comparing each content in the second PSI reported by the UE with each content in a PSI obtained from the UDR. When (a) in the two PSIs is the same and (b) in the two PSIs is the same, but (c) in the two PSIs are different, the network device determines that the URSP rule in the user equipment needs to be updated, and may deliver an updated URSP (that is, a latest URSP) to the UE. When the (a) in the two PSIs is the same, (b) in the two PSIs is the same, and (c) in the two PSIs is the same, the network device determines that the URSP rule in the user equipment does not need to be updated.

When the policy generation attribute includes the timestamp parameter, logic in which the network device determines whether route selection policy update needs to be performed is similar to logic mention herein. Details are not described herein again.

S603. In a case of determining, according to the second policy generation attribute in the reported second PSI, that route selection policy update needs to be performed on the user equipment, the network device triggers performing a step of delivering a first route selection policy to the user equipment, that is, triggers performing step S604.

S604. The network device delivers the first route selection policy and a corresponding first PSI to the user equipment.

Correspondingly, the user equipment may receive the first route selection policy and the corresponding first PSI delivered by the network device. In addition, after receiving the first PSI delivered by the network device, the user equipment may first compare (a) in the delivered first PSI with (a) in the stored PSI, and compare (b) in the delivered first PSI with (b) in the stored PSI. When (a) in the two PSIs is the same and (b) in the two PSIs is the same, the network device may trigger performing step S605.

S605. The user equipment updates a stored second route selection policy by using the delivered first route selection policy in a case of determining, according to a first policy generation attribute in the delivered first route selection policy, that route selection policy update needs to be performed.

During specific implementation, the user equipment may compare a first policy generation attribute in the delivered first PSI with the second policy generation attribute in the stored second PSI. In a case that the first policy generation attribute is different from the second policy generation attribute, the network device determines that route selection policy update needs to be performed on the user equipment. In a case that the first policy generation attribute is the same as the second policy generation attribute, the network device determines that route selection policy update does not need to be performed on the user equipment.

Based on the foregoing description, when the policy generation attribute includes the version number parameter, a method in which the user equipment determines whether route selection policy update needs to be performed includes: comparing each content in the second PSI delivered by the network device with each content in the stored PSI. When (a) in the two PSIs is the same and (b) in the two PSIs is the same, the user equipment determines that the PSIs correspond to a same URSP. Only when (c) version number parameters are also the same, the user equipment determines that the delivered first URSP is the same as the stored second URSP. When the (c) version number parameters are different, the user equipment determines that a rule in the stored second URSP needs to be updated, and synchronizes the rule with a rule in the latest URSP delivered by the network device.

When the policy generation attribute includes the timestamp parameter, logic in which the user equipment determines whether route selection policy update needs to be performed is similar to logic mention herein. Accordingly, redundant descriptions may be omitted herein below for the sake of improved readability.

In some embodiments of the present disclosure, by introducing a policy generation attribute into a PSI, after receiving a second PSI reported by the user equipment, the network device may compare policy generation attributes in the two PSIs, to accurately determine whether a URSP in the user equipment needs to be updated, and deliver the latest URSP to the user equipment when determining the URSP in the user equipment needs to be updated, so that the user equipment performs route selection policy update. In this way, a case that comparing (a) and (b) in PSIs causes accurately determining that the route selection policy does not need to be updated can be avoided, a problem of mismatching between the route selection policies is reduced, and the route selection policy is updated in time. In addition, after receiving the URSP and a corresponding PSI delivered by the network device, the user equipment may also compare policy generation attributes in the two PSIs, to determine whether a policy update operation is performed by using the URSP delivered by the network device. In this way, effectiveness of the policy update operation can be ensured, waste of processing resources is avoided, and the URSP is effectively updated.

Based on the foregoing descriptions of the method embodiments, some embodiments of the present disclosure further discloses an apparatus for updating a route selection policy. The apparatus for updating a route selection policy may be a computer program (including program code) run on user equipment. Referring to FIG. 7, the apparatus for updating a route selection policy may run the following units: a receiving unit 701, an updating unit 702, a reporting unit 703, and the like.

According to some embodiments of the present disclosure, some or all of the units of the apparatus for updating a route selection policy shown in FIG. 7 may be combined into one or several other units, or one (or some) of the units may further be divided into multiple smaller functional units. In this way, same operations can be implemented without affecting implementation of the technical effects of some embodiments of the present disclosure. The foregoing units are divided based on logical functions. In an actual application, a function of one unit may be implemented by a plurality of units, or functions of a plurality of units are implemented by one unit. In some embodiments of the present disclosure, the apparatus for updating a route selection policy may also include other units. During actual application, the functions may also be cooperatively implemented by other units and may be cooperatively implemented by a plurality of units.

According to some embodiments of the present disclosure, a computer program (including program code) that can perform the steps in the method for updating a route selection policy may be run on a general computing device such as a computer, which includes processing elements and storage elements such as a central processing unit (CPU), a random access memory (RAM), and a read-only memory (ROM), to construct the apparatus for updating a route selection policy shown in FIG. 7 and implement the method for updating a route selection policy in some embodiments of the present disclosure. The computer program may be recorded, for example, in a computer readable record medium and installed in the foregoing computing device by using the computer readable record medium, and run in the foregoing computing device.

In another embodiment, each unit in the apparatus for updating a route selection policy may be configured to perform the following operations.

The receiving unit 701 may be configured to receive a first route selection policy delivered by a network device, the first route selection policy including a first policy generation attribute.

The updating unit 702 may be configured to update a stored second route selection policy by using the first route selection policy in a case of determining, according to the first policy generation attribute, that route selection policy update needs to be performed.

In an implementation, the updating unit 702 may be further configured to:

- compare the first policy generation attribute with a second policy generation attribute in the second route selection policy;
- in a case that the first policy generation attribute is different from the second policy generation attribute, determine that route selection policy update needs to be performed; and
- in a case that the first policy generation attribute is the same as the second policy generation attribute, determine that route selection policy update does not need to be performed.

In another implementation, the receiving unit 701 is further configured to: receive a first policy section identifier (PSI) of the first route selection policy delivered by the network device.

The updating unit 702 may be further configured to: compare the delivered first PSI with a second PSI of the second route selection policy, and compare the first policy generation attribute with the second policy generation attribute in the second route selection policy; in a case that the first PSI is the same as the second PSI and the first policy generation attribute is different from the second policy generation attribute, determine that route selection policy update needs to be performed; and in a case that the first PSI is the same as the second PSI and the first policy generation attribute is the same as the second policy generation attribute, determine that route selection policy update does not need to be performed.

In another implementation, the reporting unit 703 is further configured to: report the second policy generation attribute in the second route selection policy to the network device, the second policy generation attribute being used for the network device to determine whether route selection policy update needs to be performed on the user equipment; and deliver the first route selection policy to the user equipment after determining that route selection policy update needs to be performed on the user equipment.

In another implementation, the updating unit 703 may be further configured to:

- report a second policy section identifier (PSI) of the second route selection policy to the network device,
- the second PSI being used for the network device to determine whether route selection policy update needs to be performed on the user equipment.

In some embodiments, by introducing a policy generation attribute into a route selection policy, after receiving a route selection policy delivered by the network device, the user equipment may first accurately determine, according to a policy generation attribute in the delivered route selection policy, whether route selection policy update needs to be performed on a route selection policy stored in a local space, so that when determining that route selection policy update needs to be performed, the user equipment updates the stored route selection policy in time by using the route selection policy delivered by the network device. In such an update manner, a problem that a policy update operation is still performed in a case that a delivered route selection policy is the same as a stored route selection policy can be avoided, effectiveness of the policy update operation can be ensured, waste of processing resources can be avoided, and the route selection policy can be effectively updated. In addition, it can be ensured that an update mechanism of the route selection policy is optimized without changing a policy section identifier (PSI) of the route selection policy, and a case that comparing PSIs causes incorrectly determining that the route selection policy does not need to be update is avoided, so that a problem of mismatching between the route selection policies is reduced, and the route selection policy is updated in time.

In some embodiments, each unit in the apparatus for updating a route selection policy may be configured to perform the following operations.

The receiving unit 701 is configured to receive a first route selection policy and a corresponding first policy section identifier (PSI) delivered by the network device, the first PSI including a first policy generation attribute in the first route selection policy.

The updating unit 702 is configured to update a stored second route selection policy by using the first route selection policy in a case of determining, according to the first policy generation attribute in the first PSI, that route selection policy update needs to be performed.

In some implementations, the updating unit 703 may be further configured to:

- report a second PSI of the stored second route selection policy to the network device, the second PSI being used for the network device to determine whether route selection policy update needs to be performed on the user equipment, and the second PSI including a second policy generation attribute.

In some implementations, the receiving unit 701 may be further configured to: receive the first route selection policy and the corresponding first PSI delivered by the network device.

According to some implementations, the updating unit 702 may be further configured to:

- compare the first policy generation attribute in the delivered first PSI with the second policy generation attribute in the stored second PSI;
- in a case that the first policy generation attribute is different from the second policy generation attribute, determine that route selection policy update needs to be performed on the user equipment; and
- in a case that the first policy generation attribute is the same as the second policy generation attribute, determine that route selection policy update does not need to be performed on the user equipment.

In some implementations, the updating unit 702 may be further configured to:

- compare a PLMN identifier in the first PSI with a PLMN identifier in the second PSI, and compare a route selection policy code in the first PSI with a route selection policy code in the second PSI; and in a case that the PLMN identifiers and the route selection policy codes in the two PSI are the same, trigger performing a step of comparing the first policy generation attribute with the second policy generation attribute.

According to some embodiments, by introducing a policy generation attribute into a route selection policy, after receiving a route selection policy and a corresponding PSI delivered by the network device, the user equipment may first accurately determine, according to a policy generation attribute in the delivered PSI, whether route selection policy update needs to be performed on a route selection policy stored in a local space, so that when determining that route selection policy update needs to be performed, the user equipment updates the stored route selection policy in time by using the route selection policy delivered by the network device. In such an update manner, a problem that a policy update operation is still performed in a case that a delivered route selection policy is the same as a stored route selection policy can be avoided, effectiveness of the policy update operation can be ensured, waste of processing resources can be avoided, and the route selection policy can be effectively updated. In addition, an update mechanism of the route selection policy can be optimized, and a case that comparing existing content in PSIs causes incorrectly determining that the route selection policy does not need to be update is avoided, so that a problem of mismatching between the route selection policies is reduced, and the route selection policy is updated in time.

Figure 8:
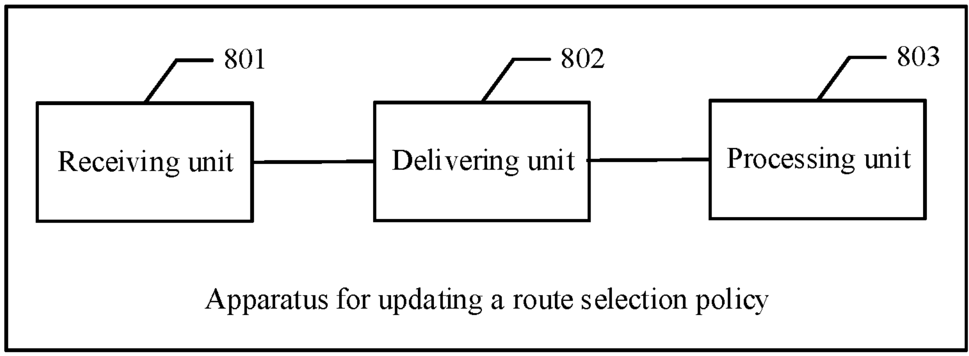
FIG. 8 is a schematic structural diagram of an apparatus for updating a route selection policy according to some embodiments.

Based on the foregoing descriptions of the method embodiments, some embodiments of the present disclosure may further disclose an apparatus for updating a route selection policy. The apparatus for updating a route selection policy may be a computer program (including program code) run on a network device. Referring to FIG. 8, the apparatus for updating a route selection policy may run the following units: a receiving unit 801, a delivering unit 803, a processing unit 803, and the like.

According to some embodiments of the present disclosure, some or all of the units of the apparatus for updating a route selection policy shown in FIG. 8 may be combined into one or several other units, or one (or some) of the units may further be divided into multiple smaller functional units. In this way, same operations can be implemented without affecting implementation of the technical effects of some embodiments of the present disclosure. The foregoing units are divided based on logical functions. In an actual application, a function of one unit may be implemented by a plurality of units, or functions of a plurality of units are implemented by one unit. In some embodiments of the present disclosure, the apparatus for updating a route selection policy may also include other units. During actual application, the functions may also be cooperatively implemented by other units and may be cooperatively implemented by a plurality of units.

According to some embodiments of the present disclosure, a computer program (including program code) that can perform the steps in the method for updating a route selection policy may be run on a general computing device such as a computer, which includes processing elements and storage elements such as a central processing unit (CPU), a random access memory (RAM), and a read-only memory (ROM), to construct the apparatus for updating a route selection policy shown in FIG. 8 and implement the method for updating a route selection policy in some embodiments of the present disclosure. The computer program may be recorded, for example, in a computer readable record medium and installed in the foregoing computing device by using the computer readable record medium, and run in the foregoing computing device.

In some embodiments, each unit in the apparatus for updating a route selection policy may be configured to perform the following operations.

The receiving unit 801 is configured to receive a second policy generation attribute reported by user equipment.

The delivering unit 802 is configured to deliver a first route selection policy to the user equipment in a case of determining, according to the second policy generation attribute, that route selection policy update needs to be performed on the user equipment, the first route selection policy including a first policy generation attribute, the first policy generation attribute being used for the user equipment to determine whether route selection policy update needs to be performed; and in a case that the user equipment determines that route selection policy update needs to be performed, the first route selection policy being used for updating a second route selection policy stored in the user equipment.

In some implementations, the delivering unit 802 may be further configured to:

deliver a first policy section identifier (PSI) of the first route selection policy to the user equipment, the first PSI being used for the user equipment to determine whether route selection policy update needs to be performed.

In another implementation, the receiving unit 801 may be further configured to obtain a latest route selection policy.

The apparatus may further include the processing unit 803. The processing unit 803 may be configured to:

compare the second policy generation attribute with a policy generation attribute in the latest route selection policy;

in a case that the second policy generation attribute is different from the policy generation attribute in the latest route selection policy, determine that route selection policy update needs to be performed on the user equipment, and use the latest route selection policy as the first route selection policy; and in a case that the reported second policy generation attribute is the same as the policy generation attribute in the latest route selection policy, determine that route selection policy update does not need to be performed on the user equipment.

In some implementations, the receiving unit 801 may be further configured to obtain a latest route selection policy; and receive a second policy section identifier (PSI) reported by the user equipment.

The processing unit 803 may be further configured to: compare the second PSI with a PSI of the latest route selection policy, and compare the second policy generation attribute with a policy generation attribute in the latest route selection policy;

in a case that the second PSI is the same as the PSI of the latest route selection policy and the second policy generation attribute is different from the policy generation attribute in the latest route selection policy, determine that route selection policy update needs to be performed, and use the latest route selection policy as the first route selection policy; and in a case that the second PSI is the same as the PSI of the latest route selection policy and the second policy generation attribute is the same as the policy generation attribute in the latest route selection policy, determine that route selection policy update does not need to be performed.

In some embodiments of the present disclosure, by introducing a policy generation attribute into a route selection policy, the user equipment may report a policy generation attribute in a stored route selection policy to the network device, so that the network device may determine, according to the reported policy generation attribute, whether route selection policy update needs to be performed on the user equipment, and deliver a latest route selection policy to the user equipment in a case of determining that route selection policy update needs to be performed on the user equipment. In this way, a case that comparing PSIs causes incorrectly determining that the route selection policy does not need to be update can be avoided, so that a problem of mismatching between the route selection policies is reduced, and the route selection policy is updated in time. In addition, the network device delivers a route selection policy including a policy generation attribute to the user equipment, so that the user equipment may first accurately determine, according to the policy generation attribute in the delivered route selection policy, whether route selection policy update needs to be performed on a route selection policy stored in a local space, and update the stored route selection policy in time by using the route selection policy delivered by the network device in a case of determining that route selection policy update needs to be performed. In such an update manner, a problem that a policy update operation is still performed in a case that a delivered route selection policy is the same as a stored route selection policy can be avoided, effectiveness of the policy update operation can be ensured, waste of processing resources can be avoided, and the route selection policy can be effectively updated.

In some embodiments, each unit in the apparatus for updating a route selection policy may be configured to perform the following operations.

The delivering unit 802 is configured to deliver a first route selection policy and a corresponding first policy section identifier (PSI) to user equipment, the first PSI including a first policy generation attribute in the first route selection policy, the first policy generation attribute being used for the user equipment to determine whether route selection policy update needs to be performed; and in a case that the user equipment determines that route selection policy update needs to be performed, the first route selection policy being used for updating a second route selection policy stored in the user equipment.

In some implementations, the receiving unit 801 may be configured to: receive a second PSI reported by the user equipment.

The processing unit 803 may be configured to determine, according to the second policy generation attribute in the second PSI, whether route selection policy update needs to be performed on the user equipment.

In some implementations, the processing unit 803 may be further configured to:

compare a PLMN identifier in the second PSI with a PLMN identifier in a PSI of a latest route selection policy, and compare a route selection policy code in the second PSI with a route selection policy code in the PSI of the latest route selection policy; and in a case that the PLMN identifiers and the route selection policy codes in the two PSIs are the same, trigger performing a step of determining, according to the second policy generation attribute in the second PSI, whether route selection policy update needs to be performed on the user equipment.

In some implementations, when being configured to determine, according to the second policy generation attribute in the second PSI, whether route selection policy update needs to be performed on the user equipment, the processing unit 803 may be specifically configured to:

compare the second policy generation attribute in the second PSI with a policy generation attribute in the PSI of the latest route selection policy;

in a case that the second policy generation attribute is different from the policy generation attribute in the PSI of the latest route selection policy, determine that route selection policy update needs to be performed on the user equipment; and in a case that the second policy generation attribute is the same as the policy generation attribute in the PSI of the latest route selection policy, determine that route selection policy update does not need to be performed on the user equipment.

In some embodiments, by introducing a policy generation attribute into a route selection policy, the network device may deliver a PSI including a policy generation attribute to the user equipment, and the user equipment may first accurately determine, according to the policy generation attribute in the delivered PSI, whether route selection policy update needs to be performed on a route selection policy stored in a local space, so that when determining that route selection policy update needs to be performed, the user equipment updates the stored route selection policy in time by using the route selection policy delivered by the network device. In such an update manner, a problem that a policy update operation is still performed in a case that a delivered route selection policy is the same as a stored route selection policy can be avoided, effectiveness of the policy update operation can be ensured, waste of processing resources can be avoided, and the route selection policy can be effectively updated. In addition, an update mechanism of the route selection policy can be optimized, and a case that comparing existing content in PSIs causes incorrectly determining that the route selection policy does not need to be update is avoided, so that a problem of mismatching between the route selection policies is reduced, and the route selection policy is updated in time.

Figure 9:
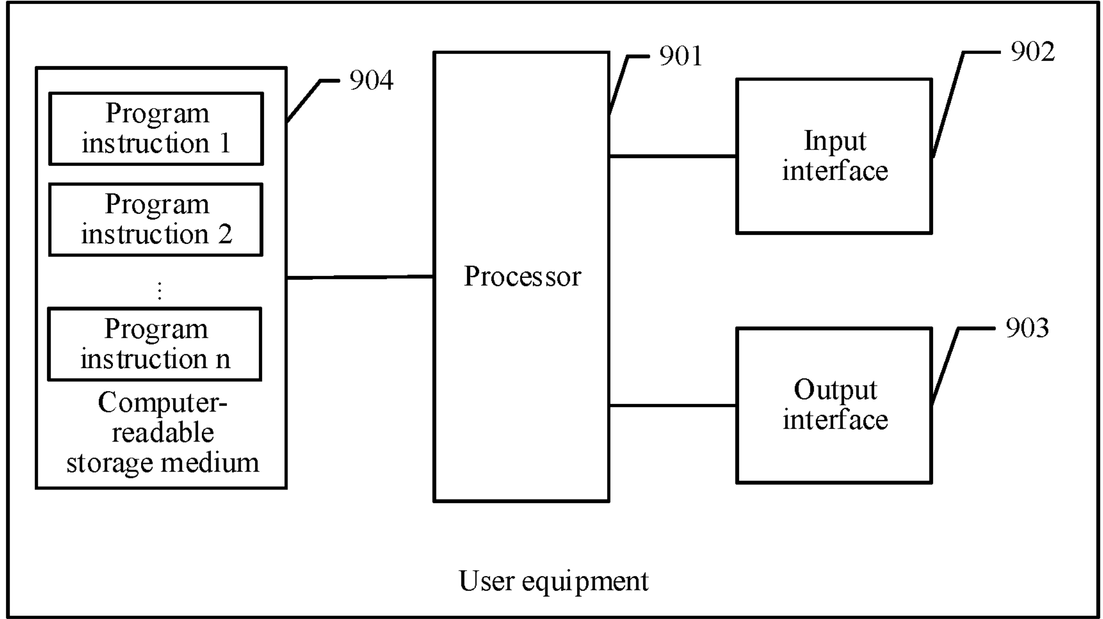
FIG. 9 is a schematic structural diagram of user equipment according to some embodiments.

Based on the descriptions of the method embodiments and apparatus embodiments, some embodiments of the present disclosure may further provides user equipment. Referring to FIG. 9, the user equipment may include at least a processor 901, an input interface 902, an output interface 903, and a computer-readable storage medium 904. The processor 901, the input interface 902, the output interface 903, and the computer-readable storage medium 904 in the user equipment may be connected by a bus or in another manner. The computer-readable storage medium 904 may be stored in a memory of the user equipment. The computer-readable storage medium 904 is configured to store a computer program. The computer program includes program instructions. The processor 901 is configured to execute the program instructions stored in the computer-readable storage medium 904. The processor 901 (or referred to as a central processing unit (CPU)) is a computing core and a control core of the user equipment, is suitable for implementing one or more instructions, and is specifically suitable for loading and executing one or more instructions to implement a corresponding method procedure or a corresponding function.

In some embodiments, the processor 901 in some embodiments of the present disclosure may be configured perform a series of route selection policy update processing, which specifically includes: receiving a first route selection policy delivered by a network device, the first route selection policy including a first policy generation attribute; and updating a stored second route selection policy by using the first route selection policy in a case of determining, according to the first policy generation attribute, that route selection policy update needs to be performed. Alternatively, the processor 901 in some embodiments of the present disclosure may be configured to perform a series of route selection policy update processing, which specifically includes: receiving a first route selection policy and a corresponding first policy section identifier (PSI) delivered by a network device, the first PSI including a first policy generation attribute in the first route selection policy; and updating a stored second route selection policy by using the first route selection policy in a case of determining, according to the first policy generation attribute, that route selection policy update needs to be performed.

Figure 10:
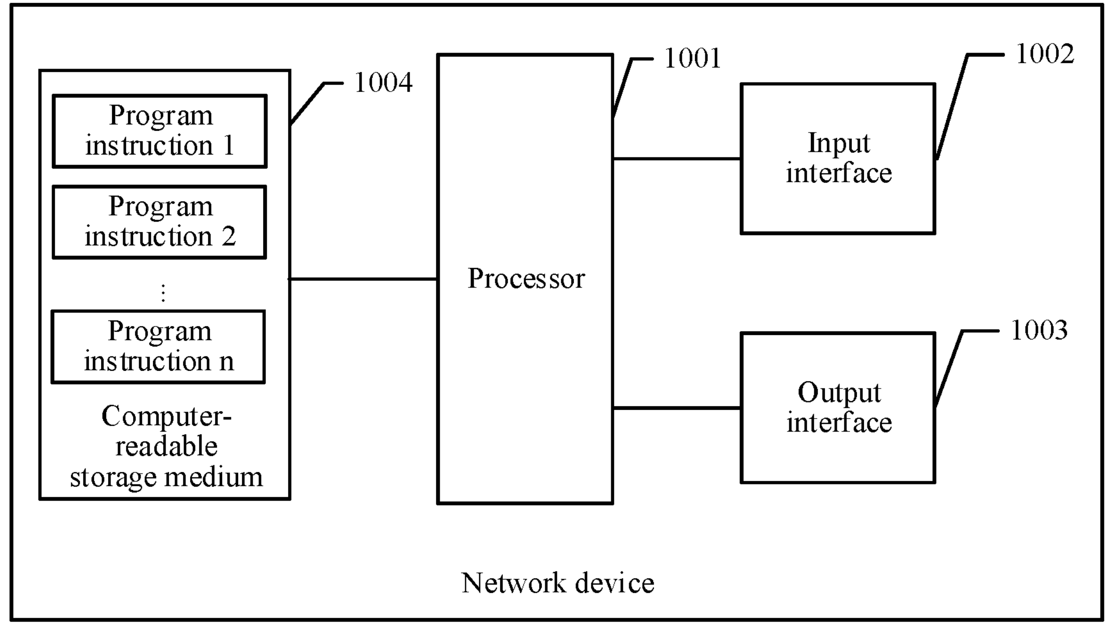
FIG. 10 is a schematic structural diagram of a network device according to some embodiments.

Based on the descriptions of the foregoing method embodiments and apparatus embodiments, some embodiments of the present disclosure may further provide a network device. Referring to FIG. 10, the network device includes at least a processor 1001, an input interface 1002, an output interface 1003, and a computer-readable storage medium 1004. The processor 1001, the input interface 1002, the output interface 1003, and the computer-readable storage medium 1004 in the network device may be connected by a bus or in another manner. The computer-readable storage medium 1004 may be stored in a memory of the network device. The computer-readable storage medium 1004 is configured to store a computer program. The computer program includes program instructions. The processor 1001 is configured to execute the program instructions stored in the computer-readable storage medium 1004. The processor 1001 (or referred to as a central processing unit (CPU)) is a computing core and a control core of the network device, is suitable for implementing one or more instructions, and is specifically suitable for loading and executing one or more instructions to implement a corresponding method procedure or a corresponding function.

In some embodiments, the processor 1001 in some embodiments of the present disclosure may be configured perform a series of route selection policy update processing, which specifically includes: receiving a second policy generation attribute reported by user equipment; and delivering a first route selection policy to the user equipment in a case of determining, according to the second policy generation attribute, that route selection policy update needs to be performed on the user equipment, the first route selection policy including a first policy generation attribute, the first policy generation attribute being used for the user equipment to determine whether route selection policy update needs to be performed; and in a case that the user equipment determines that route selection policy update needs to be performed, the first route selection policy being used for updating a second route selection policy stored in the user equipment. Alternatively, the processor 1001 in some embodiments of the present disclosure may be configured to perform a series of route selection policy update processing, which specifically includes: delivering a first route selection policy and a corresponding a first policy section identifier (PSI) to user equipment, the first PSI including a first policy generation attribute in the first route selection policy, the first policy generation attribute being used for the user equipment to determine whether route selection policy update needs to be performed; and in a case that the user equipment determines that route selection policy update needs to be performed, the first route selection policy being used for updating a second route selection policy stored in the user equipment.

Some embodiments of the present disclosure may further provide a computer-readable storage medium (memory), and the computer-readable storage medium is a memory device in a computer device (for example, the user equipment or the network device) and is configured to store programs and data. It may be understood that the computer-readable storage medium herein may include an internal storage medium in the computer device and certainly may also include an extended storage medium supported by the computer device. The computer-readable storage medium provides storage space, and the storage space stores an operating system of the computer device. In addition, the storage space further stores one or more instructions adapted to be loaded and executed by the processor. The instructions may be one or more computer programs (including program code). The computer-readable storage medium herein may be a high-speed RAM memory, or may be a non-volatile memory such as at least one magnetic disk storage. Optionally, the computer-readable storage medium may be at least one computer-readable storage medium far away from the foregoing processor.

(1) When the computer device is the user equipment, in an embodiment, the processor may load and execute one or more instructions stored in the computer-readable storage medium, to implement the corresponding steps in the embodiment of the method for updating a route selection policy shown in FIG. 2 or FIG. 4.

In some embodiments, the processor may load and execute one or more instructions stored in the computer-readable storage medium, to implement the corresponding steps in the embodiment of the method for updating a route selection policy shown in FIG. 6.

(2) When the computer device is the network device, in some embodiment, the processor may load and execute one or more instructions stored in the computer-readable storage medium, to implement the corresponding steps in the embodiment of the method for updating a route selection policy shown in FIG. 2 or FIG. 4.

In some embodiments, the processor may load and execute one or more instructions stored in the computer-readable storage medium, to implement the corresponding steps in the embodiment of the method for updating a route selection policy shown in FIG. 6.

According to an aspect of some embodiments of the present disclosure, a computer program product or a computer program is further provided, the computer program product or the computer program including computer instructions, the computer instructions being stored in a computer-readable storage medium. The processor of the computer device reads the computer instructions from the computer-readable storage medium, and the processor executes the computer instructions, to cause the computer device to perform the method provided in various optional manners in the foregoing embodiment of the method for updating a route selection policy shown in FIG. 2, FIG. 4, or FIG. 6.

In addition, it is to be understood that what is disclosed above are merely examples of embodiments of the present disclosure, and certainly are not intended to limit the protection scope of the application. Therefore, equivalent variations made in accordance with the claims of this application shall fall within the scope of this application.

What is claimed is:

1. A method for updating a route selection policy, performed by a user equipment having at least one processor, the method comprising:

receiving a first route selection policy from a network device, the first route selection policy comprising a first policy generation attribute, the first policy generation attribute including a first version number parameter or a first timestamp parameter, the first timestamp parameter indicating a generation time of the first route selection policy;

determining whether a route selection policy update needs to be performed by comparing the first policy generation attribute with a second policy generation attribute, the second policy generation attribute including a second version number parameter or a second timestamp parameter, the second timestamp parameter indicating a generation time of a second route selection policy, wherein the second route selection policy comprises the second policy generation attribute and is stored in the user equipment, wherein the comparing the first policy generation attribute with the second policy generation attribute comprises:

comparing the first version number parameter with the second version number parameter; or comparing the first timestamp parameter with the second timestamp parameter;

based on the first policy generation attribute being the same as the second policy generation attribute, determining that the route selection policy update does not need to be performed;

based on the first policy generation attribute being different from the second policy generation attribute, determining that the route selection policy update needs to be performed; and based on determining that the route selection policy update needs to be performed, updating the second route selection policy based on the first route selection policy, wherein the updating the stored second route selection policy comprises:

replacing the second route selection policy with the first route selection policy; or determining updated content in the first route selection policy relative to the second route selection policy and replacing corresponding content in the second route selection policy with the updated content.

2. The method according to claim 1, further comprising:

receiving a first policy section identifier (PSI) of the first route selection policy from the network device; and comparing the first PSI with a second PSI of the second route selection policy.

3. The method according to claim 2, further comprising:

based on the first PSI being the same as the second PSI and the first policy attribute being different from the second policy generation attribute, determining that the route selection policy update needs to be performed; or based on the first PSI being the same as the second PSI and the first policy generation attribute being the same as the second policy generation attribute, determining that the route selection policy update does not need to be performed.

4. The method according to claim 1, the method further comprising:

reporting the second policy generation attribute to the network device, wherein the network device is configured to;

determine whether the route selection policy update needs to be performed on the user equipment based on the second policy generation attribute; and deliver the first route selection policy to the user equipment after determining that the route selection policy update needs to be performed on the user equipment.

5. The method according to claim 4, further comprising:

reporting a second policy section identifier (PSI) of the second route selection policy to the network device, wherein the network device is further configured to determine whether the route selection policy update needs to be performed on the user equipment based on the second PSI.

6. An apparatus for updating a route selection policy, the apparatus comprising:

at least one memory containing program code; and at least one processor configured to execute the program code, the program code comprising:

first receiving code configured to cause the at least one processor to receive a first route selection policy from a network device, the first route selection policy comprising a first policy generation attribute, the first policy generation attribute being a first version number parameter or a first timestamp parameter, the first timestamp parameter indicating a generation time of the first route selection policy;

first comparing code configured to cause the at least one processor to compare the first policy generation attribute with a second policy generation attribute, the second policy generation attribute being a second version number parameter or a second timestamp parameter, the second timestamp parameter indicating a generation time of a second route selection policy;

first determining code configured to cause the at least one processor to:

determine whether a route selection policy update needs to be performed, wherein the second route selection policy comprises the second policy generation attribute and is stored in the user equipment, and wherein the first policy generation attribute is compared with the second policy generation attribute by (i) comparing the first version number parameter with the second version number parameter or (ii) comparing the first timestamp parameter with the second timestamp parameter, second determining code configured to cause the at least one processor to:

based on the first policy generation attribute being the same as the second policy generation attribute, determine that the route selection policy update does not need to be performed, based on the first policy generation attribute being different from the second policy generation attribute, determine that the route selection policy update needs to be performed; and first updating code configured to cause the at least one processor to, based on determining that the route selection policy update needs to be performed, update the second route selection policy based on the first route selection policy, wherein the second route selection policy is updated by:

replacing the second route selection policy with the first route selection policy; or determining updated content in the first route selection policy relative to the second route selection policy and replacing corresponding content in the second route selection policy with the updated content.

7. The apparatus according to claim 6, wherein the program code further comprises:

second receiving code configured to cause the at least one processor to receive a first policy section identifier (PSI) of the first route selection policy from the network device; and second comparing code configured to cause the at least one processor to compare the first PSI with a second PSI of the second route selection policy.

8. The apparatus according to claim 7, the program code further comprises:

second determining code configured to cause the at least one processor to;

based on the first PSI being the same as the second PSI and the first policy generation attribute being different from the second policy generation attribute, determine that the route selection policy update needs to be performed; or based on the first PSI being the same as the second PSI and the first policy generation attribute being the same as the second policy generation attribute, determine that the route selection policy update does not need to be performed.

9. The apparatus according to claim 6, wherein the program code further comprises:

first reporting code configured to cause the at least one processor to report the second policy generation attribute to the network device, wherein the network device is configured to determine whether the route selection policy update needs to be performed on the user equipment based on the second policy generation attribute; and first delivery code configured to cause the at least one processor to deliver, by the network device, the first route selection policy to the user equipment after determining that the route selection policy update needs to be performed on the user equipment.

10. A non-transitory computer-readable medium for vehicle control containing program code that, when executed by at least one processor, causes the at least one processor to:

receive a first route selection policy from a network device, the first route selection policy comprising a first policy generation attribute, the first policy generation attribute being a first version number parameter or a first timestamp parameter, the first timestamp parameter indicating a generation time of the first route selection policy;

compare the first policy generation attribute with a second policy generation attribute, the second policy generation attribute being a second version number parameter or a second timestamp parameter, the second timestamp parameter indicating a generation time of a second route selection policy, wherein the second route selection policy comprises the second policy generation attribute, and wherein the first policy generation attribute is compared with the second policy generation attribute by (i) comparing the first version number parameter with the second version number parameter or (ii) comparing the first timestamp parameter with the second timestamp parameter;

based on the first policy generation attribute being the same as the second policy attribute, determine that a route selection policy update does not need to be performed;

based on the first policy generation attribute being different from the second policy generation attribute, determine that the route selection policy update needs to be performed; and based on determining that the route selection policy update needs to be performed, update the second route selection policy based on the first route selection policy, wherein the second route selection policy is updated by:

replacing the second route selection policy with the first route selection policy; or determining updated content in the first route selection policy relative to the second route selection policy and replacing corresponding content in the second route selection policy with the updated content.

* * * * *